United States Patent [19]

Kálal et al.

[11] 4,093,602

[45] June 6, 1978

[54] POLYMERIC MATERIAL CONTAINING ALDEHYDE GROUPS AND THE METHOD OF ITS PREPARATION

[75] Inventors: Jaroslav Kálal; Eva Žurkova, both of Prague; František Švec, Kladno, all of Czechoslovakia

[73] Assignee: Ceskoslovanska akademie ved, Prague, Czechoslovakia

[21] Appl. No.: 623,964

[22] Filed: Oct. 20, 1975

[30] Foreign Application Priority Data

Oct. 24, 1974 Czechoslovakia .................. 7282/74

[51] Int. Cl.$^2$ .................. C08G 2/00; C08G 12/04; C08G 2/26

[52] U.S. Cl. .................. 260/73 R; 260/67 UA; 260/72 R

[58] Field of Search .............. 260/67 UA, 72 R, 73 R

[56] References Cited

U.S. PATENT DOCUMENTS

| | | | |
|---|---|---|---|
| 3,079,357 | 2/1963 | Fischer | 260/73 R |
| 3,154,599 | 10/1964 | Wismer et al. | 260/73 R |
| 3,379,688 | 4/1968 | Boning | 260/73 R |
| 3,770,702 | 11/1973 | Roper et al. | 260/73 R |
| 3,813,353 | 5/1974 | Clemens et al. | 260/67 UA |

*Primary Examiner*—Herbert J. Lilling

[57] ABSTRACT

Three-dimensional polymeric material in the form of spherical particles of diameter $\leq 3$ mm and containing up to 40% of free aldehyde groups which exhibits a measurable specific surface area is prepared by copolymerization of an aldehyde monomer $R_1CH=C(CH=O)R_2$, where $R_1$ is H, $C_{1-5}$ alkyl, aryl or furyl and $R_2$ is H, $C_{1-5}$ alkyl, halogen, CN, phenyl or furyl, with a crosslinking agent in the aqueous dispersion phase. The dispersion contains 1 – 25% of a component reducing the monomer solubility in water, which is either an inorganic salt of alkali metal or alkaline earth metal or a water-soluble alcohol. The crosslinking agent used as comonomer is divinylbenzene, diester $CH_2=C(R_1)COOR_2OCOC(R_1)=CH_2$ ($R_1$ = H, $C_{1-10}$ alkyl or halogen; $R_2$ = $C_{1-10}$ alkylene or hydroxyalkylene), or diamide $CH_2=C(R_1)CONHR_2NHCOC(R_1)=CH_2$ ($R_1$ = H, $C_{1-10}$ alkyl or halogen; $R_2$ = $C_{1-10}$ alkylene or phenylene). The material may be used in continuous column processes, e.g. in catalysis of organic syntheses, separation of amines, and immobilization of compounds which contain primary amino groups.

4 Claims, No Drawings

POLYMERIC MATERIAL CONTAINING ALDEHYDE GROUPS AND THE METHOD OF ITS PREPARATION

The invention relates to the polymeric material which contains reactive aldehyde groups and to the method of its preparation by suspension copolymerization of unsaturated aldehydes with crosslinking agents. Three-dimensional copolymers resulting from this reaction are either microreticular or macroporous according to the nature and concentration of a diluent used in the copolymerization.

The gels formed by copolymerization of the monomer with a small amount of a crosslinking more than bifunctional comonmer do not exhibit the permanent porosity in the dry state and swell only in a suitable solvent. The inherent structure of the material and, consequently, also the equilibrium degree of swelling are a function of cross-links density in the copolymer which depend on the fraction of the crosslinking comonomer in the initial copolymerization mixture. Gels prepared in this way were generally named homogeneous or microreticular gels.

Heterogeneous gels are formed by copolymerization of a bifunctional monomer with a larger portion of the crosslinking monomer in the presence of an inert component which may be represented by an organic solvent, inert polymers or their mixture. Copolymer particles are permanently porous — macroreticular even in the dry state.

Macroreticular gels containing free aldehyde groups which are prepared by common system in suspension are obtained in a form or irregular nonspherical particles with the limited possibility to increase their active surface.

However, the necessary condition for application of polymeric materials in continuous column processes is the spherical shape and a sufficient mechanical strength of particles.

Until present, the spherical polymeric particles with free aldehyde groups were obtained by the chemical modification of natural or synthetic polymers carried out in several reaction steps.

All aforesaid disadvantages are overcome with materials according to this invention and the method for their preparation.

An objective of the invention are polymeric materials in the form of spherical particles of diameter below 3 mm which have good mechanical properties and contain up to 40% of free aldehyde groups. These materials are composed from monomeric units of the general formula I:

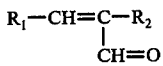

where $R_1$ is hydrogen, alkyl, aryl, furyl, and the like, and $R_2$ is hydrogen, alkyl, aryl, halogen, nitrile group, furyl, and the like, and a crosslinking agent. Following aldehydes may be advantageously used: acrylaldehyde, methacrylaldehyde cinnamaldehyde, 2-methylcinnamaldehyde, 3-(2-furyl)acrylaldehyde, crotonaldehyde, and others.

Polymeric materials of this type may exhibit an measurable specific surface areaa.

As crosslinking agents, they are used diesters of the general formula II

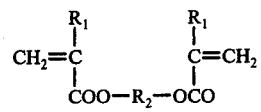

where $R_1$ is hydrogen, alkyl, or halogen and $R_2$ is alkyl or hydroxyalkyl (especially suitable are ethylene glycol dimethacrylate, glycerol dimethacrylate, and dimethacryloyl butanetetral), diamides of the general formula III:

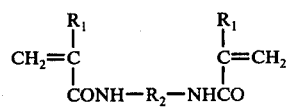

where $R_1$ is hydrogen, alkyl or halogen and $R_2$ is alkyl or phenyl (methylene-bis-acrylamide is advantageously used), or divinylbenzene.

The method for preparation of these spherical materials containing free aldehyde groups consists in a suspension copolymerization of unsaturated aldehyde with the crosslinking agent in a water-dispersion phase which contains 1 – 25% of a component suppressing the water solubility of aldehyde, as are inorganic salts, e.g. nitrates, halides, carbonates, sulfates and phosphates of metals of the 1st and 2nd group, especially sodium chloride. The solubility suppressing component may be also a soluble mono- or multivalent alcohol, e.g. ethanol, isopropanol, ethylene glycol, or glycerol. Isopropanol proved especially well.

The method of performance of the suspension polymerization and isolation of the product does not differ from the known methods in principle. Radical initiators soluble in the monomeric phase and insoluble in water are used as copolymerization initiators, i.e. aliphatic azo compounds, diacyl peroxides, and the like. Water soluble polymers commonly used as protective colloids serve as the suspension stabilizer, for example polyvinylpyrrolidone, polyvinylalcohol, starch, etc. The inert component is an organic solvent insoluble in water and liquid at the polymerization temperature which has properties of a good solvent of the copolymer and swells the three-dimensional copolymer. The precipitant is an organic compound which is liquid at the polymerization temperature in the mixture with monomer, comonomer and an inert solvent and is a bad solvent of the copolymer while dissolves the monomers.

The prepared gel is separated from the dispersion medium by filtration and freed of organic solvents, which have been used as the inert component to control the pore size distribution, and of residual monomers, as e.g. styrene, divinylbenzene, and the like, by steam distillation or extraction with a low-boiling solvent, for example with ethanol. The suspension stabilizer and other water soluble components of the system are removed by the repeated washing with water. The obtained copolymeric materials are dried and then fractionated in a wet or dry state on sieves according to their particle size.

The polymeric material is obtained in this way in the form of particles ready for the instant application by the single operation in contradistinction to procedures formerly used, because it already contains free aldehyde groups.

This type of polymers is suitable above all for application in the catalysis of organic syntheses, for bonding of compounds which contain primary amino groups (also from biochemical materials), for separation of amines from mixtures, and the like.

The advantage consists in an easy isolation of the solid carrier after the reaction has been performed.

The invention is further described in examples of performance, which illustrate the objective of it but do not limit its scope by any means. The part and percent given in the examples of performance are weight parts and percent unless is other stated explicitly.

EXAMPLE 1

An autoclave equipped with a stirrer was charged with 300 parts of redistilled water containing 3 parts of dissolved polyvinylpyrrolidone (MW 360,000) and 40 parts of NaCl, 135 parts of an organic phase and 0.54 part of azobisisobutyronitrile. The composition of the organic phase was as follows: monomers – 54 parts including 16.2 parts (30) of methacrylaldehyde and 37.8 parts of divinylbenzene; inert components – toluene 40.5 parts and decane 40.5 parts. The mixture was first freed of air by bubbling through with nitrogen for 15 minutes. Then the autoclave was sealed, stirring was started (300 r.p.m.) and the polymerization was carried out for 2 hours at 70° C and for 6 hours at 80° C. The heating was stopped and stirring was continued until the polymerization mixture cooled down (for about 4 hours). The polymerization mixture was transfered into a 3 l. beaker and the polymer was freed of admixture by two decantations with a mixture ethanol - water (1:1 v/v) and three decantation with ethanol. The polymer obtained was separated on a fritted-glass filter and dried in a vacuum oven at the temperature 40° C and the pressure $6 \times 10^3$ N/m$^2$ to the constant weight. The conversion degree was 82%. It was found by a sieve analysis that the major part of the polymeric material (69.6%) consists of spherical particles larger than 125 μm. The concentration of free aldehyde groups in the gel determined by IR spectroscopy was 24.6 wt.%. The specific surface area determined by a method of dynamic desorption was 61.2 m$^2$/g.

EXAMPLE 2

The method described in Example 1 was used for copolymerization in a system consisting of 300 parts of redistilled water, 3 parts of polyvinylpyrrolidone (MW 360,000), 20 parts of sodium chloride, 135 parts of an organic phase, and 0.5 part of azobisisobutyronitrile. Composition of the organic phase: monomers 54 parts (consisting of 5.4 parts of methacryladehyde, 10.8 parts of styrene and 37.8 parts of divinylbenzene); inert components — 40.5 parts of dodecane and 40.5 parts of toluene. The conversion achieved was 62%. The product was separated according to Example 1; it contained 7.2% of free aldehyde groups, its specific surface area was 56 m$^2$/g and consists of 80% of spherical particles of 125 – 250 μm size.

EXAMPLE 3

The suspension copolymerization, processing of the product and composition of the reaction mixture were similar as in Example 1, with the distinction that 40 g of isopropanol was used instead of sodium chloride. The conversion to polymer was 75%. The resulting product contained 25.2 wt.% of free aldehyde groups, 63.6% of spherical particles of the size 125 – 250 μm, and its specific surface area was 214 m$^2$/g.

EXAMPLE 4

The suspension copolymerization, processing of the product and composition of the reaction mixture were similar as in Example 2, with the destinction that 30 g of isopropanol was used instead of sodium chloride. The conversion to polymer was 58%. The resulting product contained 6.9 wt.% of free aldehyde groups and its specific surface area was 198 m$^2$/g.

EXAMPLE 5

The suspension copolymerization, processing of the product and composition of the reaction mixture were similar as in Example 1, which the distinction that acrylaldehyde was used in the same amount instead of methacrylaldehyde. The conversion to polymer was 72%, concentration of free aldehyde groups in the product was 20.8%, the specific surface area was 52 m$^2$/g and the product contained 65% of spherical particles of the size 125 – 250 μm.

EXAMPLE 6

The suspension copolymerization, processing of the product and composition of the reaction mixture were similar as in Example 1, with the distinction that ethylacrylaldehyde was used in the same amount instead of methacrylaldehyde. The conversion to polymer was 63.2%; concentration of free aldehyde groups in the product was 15.3%; the specific surface area was 58.8 m$^2$/g and the product contained 71% of spherical particles of the size 125 – 250 μm.

EXAMPLE 7

The suspension copolymerization was carried out in the way described in Example 1 with the system consisting of 300 parts of water, 3 parts of polyvinylpyrrolidone (MW 360,000), 40.8 parts of monomers (12.3 parts of 2-methylcinnamaldehyde, 28.5 parts of ethylene glycol dimethacrylate). 54.2 parts of inert organic components (48.8 parts of cyclohexanol and 5.4 parts of dodecyl alcohol), and 0.4 part of azobisisobutyronitrile. Spherical particles were separated according to Example 1 in the amount corresponding to 80% of the initial raw materials. The product contained 5.5% of aldehyde and the specific surface area 80 m$^2$/g was determined for the fraction 125 – 250 μm.

EXAMPLE 8

The copolymerization and processing of the product were carried out in the same way as in Example 7, with the distinction that crotonaldehyde (3-methylacrylaldehyde) was used in the same amount instead of 2-methylcinnamaldehyde. The conversion to polymer was 75% and the product contained 2.4% of aldehyde. The specific surface area of the fraction 125 – 250 μm amounted to 65 m$^2$/g.

EXAMPLE 9

The copolymerization and processing of the product were carried out in the same way as in Example 7, with the distinction that dimethacryloyl butanetetral was used in the same amount instead of ethylene glycol dimethacrylate. The conversion to polymer was 75% and the product contained 5.2% of aldehyde. The specific surface area was 60 m²/g for the fraction 125 – 250 μm.

We claim:

1. Polymeric material which is in the form of spherical particles having a diameter of up to 3 mm, contains up to 40% of free aldehyde groups, and is formed by radical copolymerization of a monomer of the general formula:

$$R_1-CH=C-R_2 \atop CH=O \qquad I,$$

where $R_1$ is selected from the group consisting of hydrogen, alkyl with 1 to 5 carbon atoms, aryl and furyl and $R_2$ is selected from the group consisting of hydrogen, alkyl with 1 to 5 carbon atoms, halogen, nitrile, aryl and furyl, with a crosslinking agent in an amount of from 43.8 to 63.6% on a molar basis.

2. Polymeric material as set forth in claim 1 which exhibits a specific surface area in the range from 52 to 214 m²/g.

3. Polymeric material as set forth in claim 1, wherein the crosslinking agent is selected from the group consisting of divinylbenzene, monomers of the general formula II

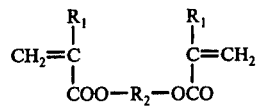

where $R_3$ is selected from the group consisting of hydrogen, alkyl containing 1 to 10 carbon atoms, and halogen and $R_4$ is selected from the group consisting of alkylene with 1 to 10 carbon atoms, hydroxyalylene having 2 to 10 carbon atoms and 2 to 4 hydroxyl groups, and monomers of the general formula III

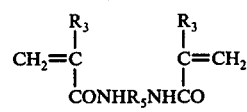

where $R_5$ is selected from the group consisting of alkylene containing 1 to 10 carbon atoms and phenylene.

4. Method for the preparation of spherical copolymeric materials containing free aldehyde groups according to claim 1 wherein radical copolymerization of the unsaturated aldehyde with the crosslinking agent in an amount of from 43.8 to 63.6% on a molar basis is carried out in an aqueous dispersion phase containing 1 – 25% of a component of of the MX type, where M is a metal cation of the Ist or IInd group of the Periodic system and X is an anion selected from the group consisting of carbonate, halide, sulphate, nitrate and phosphate and, additionally, a component which is a water-soluble mono or polyhydric aliphatic alcohol.

* * * * *